United States Patent [19]
Frank et al.

[11] 3,844,884
[45] Oct. 29, 1974

[54] ISOLATION VALVE AND CONTROL SYSTEM EMPLOYING THE SAME

[75] Inventors: Bevilacqua Frank, Windsor; William S. Flinn, Bloomfield; Malcolm D. Groves, Simsbury, all of Conn.

[73] Assignee: Combustion Engineering, Inc., Windsor, Conn.

[22] Filed: July 31, 1972

[21] Appl. No.: 276,775

[52] U.S. Cl. .............................. 176/36 R, 176/36 S
[51] Int. Cl. ............................................. G21c 7/16
[58] Field of Search ......................... 176/35, 36, 86

[56] References Cited
UNITED STATES PATENTS

| | | | |
|---|---|---|---|
| 2,975,119 | 3/1961 | Emmons | 176/36 |
| 3,088,902 | 5/1963 | Kumpf | 176/36 |
| 3,257,286 | 6/1966 | Ryon et al. | 176/35 |
| 3,442,759 | 5/1969 | Molle et al. | 176/36 |
| 3,462,345 | 8/1969 | Jabsen | 176/36 |
| 3,533,912 | 10/1970 | Dempsey | 176/36 |
| 3,595,748 | 1/1968 | Frisch et al. | 176/36 |
| 3,607,629 | 9/1971 | Frisch et al. | 176/36 |

*Primary Examiner*—Harvey E. Behrend

[57] ABSTRACT

An isolation valve particularly well suited for use in nuclear reactor hydraulic control systems is disclosed. The valve includes an electro-magnetic actuator which may be energized to open the valve thereby permitting the lift flow needed to move fission rate control devices with respect to a fuel assembly. The fission rate control devices are provided with elements comprised of magnetic material which, with the devices fully retracted from the fuel assembly, will be positioned within the magnetic field generated by the valve actuator whereby the devices will be magnetically held in the retracted position.

7 Claims, 7 Drawing Figures

ISOLATION VALVE AND CONTROL SYSTEM EMPLOYING THE SAME

BACKGROUND OF THE INVENTION

1. Field of the Invention

The present invention relates to the control of nuclear reactors. More specifically, this invention is directed to a reactor hydraulic control system employing a novel isolation valve. Accordingly, the general objects of the present invention are to provide novel and improved methods and apparatus of such character.

2. Description of the Prior Art

While not limited thereto in its utility, the present invention is particularly well suited for use with a hydraulic system for controlling the position of neutron absorber elements relative to the fuel assembly of a nuclear reactor. Reactor hydraulic control systems are well known in the art. A typical control system provides for the raising of absorber elements, in the interest of increasing fission rate and reactor power output, in response to a pressure differential established across lift pistons defined by or connected to the absorber elements. Reactor internal coolant pressure is constantly applied to one side of the lift pistons and absorber element withdrawal may therefor be accomplished by the application of a lower or "lift" pressure to the other side of selected lift pistons whereby the requisite lift flow will result.

For a number of reasons, for example to facilitate maintenance, the control valves employed to selectively provide communication between the lift pressure source and the guide tubes within which the absorber elements move have typically been located externally of the reactor pressure vessel. Since pressure vessel internal pressure is substantially higher than atmospheric pressure, the unlikely rupture of a hydraulic control line externally of the vessel, on the downstream side of the control valve, could result in the creation of a sufficient pressure differential across the lift piston to cause absorber element withdrawal. When protection against an undesired control rod withdrawal resulting from a control line rupture was deemed necessary, the prior art has typically employed hydraulic fuses installed in each control line immediately downstream of the lift piston cylinder portion of the guide tube in which the absorber element moves. The hydraulic fuse is a valve device which will automatically close the flow path if a preselected flow rate, indicative of a control line rupture, is obtained or exceeded.

There are a number of disadvantages incident to the use of a hydraulic fuse. First, the nature of the hydraulic fuse is such that it limits the maximum permissible flow through the control line and thus interfers with the speed and efficiency of normal operation. A further disadvantage of a hydraulic fuse is that it is not responsive to leakage flow rates greater than necessary to actuate the lift piston but less than the rate commensurate with total control line rupture. Thus, there can be undesired absorber element motion without operation of the fuse to close the line experiencing the leakage. Accordingly, the art has long desired means and apparatus which would provide the requisite protection presently achieved with hydraulic fuses but in a more positive manner in the sense that absorber element motion could occur only after a first deliberate or positive control action was performed. The desired control device, of course, would not limit maximum permissible lift flow.

As a further disadvantage of the hydraulic fuse, it is to be noted that the fuse is a passive device which may, since there is no practical way to test the device, be unoperated for periods approaching several years. With such passive devices there is the inherent possibility that the valving function will not be accomplished or will only be partially accomplished when needed due to various causes such as, for example, scale build-up.

A further disadvantage of prior art reactor control systems and devices is that they require continued coolant flow, known as holding flow, to maintain raised absorber elements in their "up" or out of core position. The continued flow after the absorber element or elements have been raised produces erosion of the control valve seats and other components subjected to this flow. Also, the requirement for continued lift or holding flow increases the external pumping requirement for the control system.

A further requirement of a reactor control system is that means be provided to indicate when the absorber element have reached the fully raised position. In the prior art the position indicator means have typically comprised externally mounted differential pressure responsive devices connected between the individual control lines and the reactor "hot leg." Such pressure sensitive position indicators, although performing adequately, have increased reactor control system complexity.

SUMMARY OF THE INVENTION

The present invention overcomes the above briefly discussed and other disadvantages of the prior art by providing an active and positive method and apparatus for controlling the application of pressure to a hydraulic actuator. Apparatus in accordance with the present invention includes a novel magnetically actuated isolation valve which, in the environment of a nuclear reactor, will be installed directly on the end of each of the guide tubes in which the absorber elements move.

The isolation valve of the present invention is a normally closed device which may be opened by energizing an electro-magnet. Also in accordance with the invention, the buffer elements which form the ends of the absorber element hydraulic actuator piston assemblies of a reactor control system are at least partly comprised of magnetic material. With an absorber element in the fully raised position, retraction of the absorber element having been achieved by opening the control valve to induce lift flow, the magnetic portion of the piston assembly comes within the influence of the field generated by the valve actuator electro-magnet. The absorber elements are thus magnetically held in the raised position until the magnets are deenergized.

Also in accordance with the present invention, a reactor control system may include a shut-off valve or valves located externally of the reactor vessel. The shut-off valves may be operated when the associated absorber element or elements are fully raised to disconnect the isolation valves from the lift pressure source thereby terminating the holding flow which has characterized the prior art and minimizing erosion effects and pumping requirements.

Since the inductance of the coils of the electromagnets employed to actuate the isolation valves and hold the absorber elements in the raised position will change when the magnetic material portion of the absorber element piston assembly is in proximity thereto, the monitoring of absorber element position in accordance with the present invention may be achieved by monitoring the current through the coils of the magnets.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
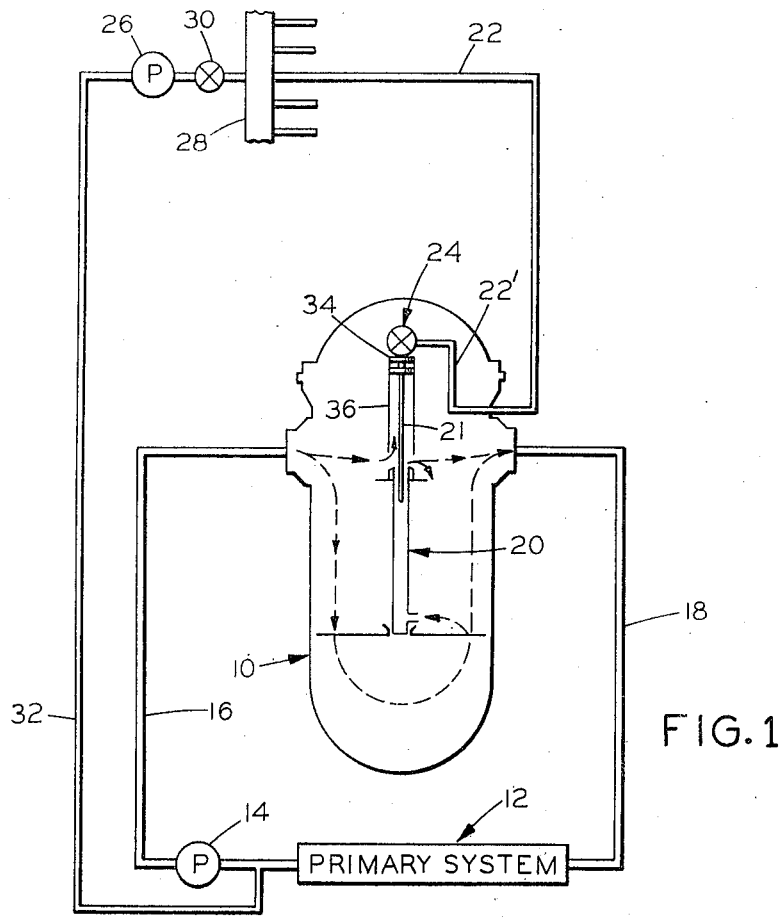
FIG. 1 is a schematic view of a reactor control system employing the present invention.

With reference now to FIG. 1, the pressure vessel of a pressurized water reactor is indicated generally at 10. Reactor vessel 10 provides a housing for the various elements of a fission type nuclear reactor of the type employed by utilities to heat a circulating coolant; the coolant thereafter being routed through the heat exchangers and other components of a steam generator and the steam thus provided being employed to drive a turbine and its associated electrical power generator.

In FIG. 1 the steam generators and associated equipment have been labelled "PRIMARY SYSTEM" and are indicated generally at 12. The main circulating pump for the coolant is indicated at 14 and supplies, via conduit or "cold leg" 16, the coolant to pressure vessel 10. The heated coolant exits from the pressure vessel 10 via conduit or "hot leg" 18 and is hereafter delivered to PRIMARY SYSTEM 12.

As is well known in the art, a core assembly including a plurality of fuel rods or elements is positioned within pressure vessel 10. Also positioned within vessel 10, in the interest of controlling the fission rate, are control or neutron absorber rod assemblies; a typical such assembly being indicated schematically and generally at 20 and including an absorber element 21. For a detailed description of a top actuated reactor control system of the type shown schematically in FIG. 1 reference may be had to copending application Ser. No. 211,308 filed Dec. 23, 1971 and assigned to the same assignee of the present invention. The disclosure of copening application Ser. No. 211,308 is incorporated herein by reference.

While not limited thereto in its utility, the isolation valve of the present invention is particularly well suited for use in the top actuated system of the type described in referenced application Ser. No. 211,308. In accordance with such a top actuated system each of the control rod assemblies has two operative positions commensurate respectively with full retraction and full insertion of its absorber element into the reactor core. As shown in FIG. 1, absorber element position control is achieved by providing each individual control rod assembly with a hydraulic actuator. The position of the absorber element is determined by the application of pressure, considering a top actuated system for purposes of explanation, to the top end of each of the hydraulic actuators. A plurality of hydraulic control lines, such as line 22—22' associated with control rod assembly 20, will penetrate the pressure vessel in order to provide for the application of the control pressure to the individual hydraulic actuators.

In accordance with the present invention a novel control or isolation valve 24 will be installed in each of the control lines 22' internally of the pressure vessel. In practice, as may be seen from FIG. 2, the isolation valves 24 are mounted directly at the top of the control rod assembly 20. The downstream side of each of valves 24 is connected, via control lines 22'—22, to a lift pump 26 via a manifold 28. For the purposes to be described below, a shut-off valve 30 may be connected between pump 26 and manifold 28. As may be seen from the flow path indicated in broken lines in FIG. 1, primary coolant delivered to pressure vessel 10 will flow through the individual control rod assemblies when both of valves 24 and 30 are open and any coolant drawn off by lift pump 26 will be returned via conduit 32 to the main coolant flow path upstream of the main circulating pump 14.

Continuing with a general discussion of reactor operation, when all of the absorber elements are in the "up" position, as shown in the case of control rod assembly 20 of FIG. 1, the reactor will be operating with maximum power output. The adjustment of reactor output power may thus be accomplished by controllably inserting or withdrawing individual absorber elements from the core.

As noted above, in accordance with the scheme of referenced application Ser. No. 211,308, each of the control rod assemblies will include a hydraulic actuator. The details of such a hydraulic actuator may be seen from FIGS. 3, 3A and 3B of copending application Ser. No. 211,308. The selective raising of individual absorber elements is accomplished by opening appropriate valves 24 whereby a lift pressure differential is established across a piston, such as piston 34 of control rod assembly 20, of the hydraulic actuators associated with the selected absorber element. As will be described below, insertion of selected individual absorber elements into the core may be achieved solely under the influence of gravity. However, in accordance with techniques accepted in the art, absorber element insertion may also be achieved by gravity with a positive pressure assist.

The principal functions of the isolation valve of the present invention are to prevent absorber element withdrawal in the event of an external control line rupture and to permit a more positive mode of absorber element position control when compared to the prior art. In order to maximize the safety enhancement provided by the invention, as noted above valve 24 is installed in control line portion 22' within the reactor pressure vessel and at the top of the control rod assembly. Thus, as may be seen in FIG. 2, each of valves 24 defines an extension of the piston cylinder of the hydraulic actuator portion of the control rod assembly. Restated, the piston 34 of the hydraulic actuator moves within a cylinder 36; cylinder 36 in turn being an extension of the guide tube in which the absorber element 21 moves. The cylinders 36 will generally extend above the reactor upper guide structure top support plate; the support plate having been omitted from the drawing in the interest of clarity. The lift pistons, such as piston 34, are connected at one end to the absorber element 21 and, at their opposite ends, each lift piston has an extension which terminates in a buffer element 38. For the purposes to be described below, buffer elements 38 include a portion comprised of a magnetic material. In the manner well known in the art, the buffer element 38 cooperates with the narrowing portion at the upper end cylinder 36 to slow down the upward motion of the absorber element assembly as it reaches its upper limit of travel thereby minimizing impact and "hammer." As shown in FIG. 2, piston 34 comprises a pair of spaced disc members which cooperate to define a high loss piston; the upper disc member also cooperating with a narrowed portion of cylinder 36 to minimize flow past the piston when the absorber element is in the fully raised position.

The isolation valve 24 comprises a ball poppet 40 which is biased, by means of a spring 42, against a valve seat defined by the end of control line portion 22'. In FIG. 2 the right hand valve is shown in the open position whereas the left hand valve is shown in the normally closed position with the ball being resiliently urged against the valve seat.

Figure 2:
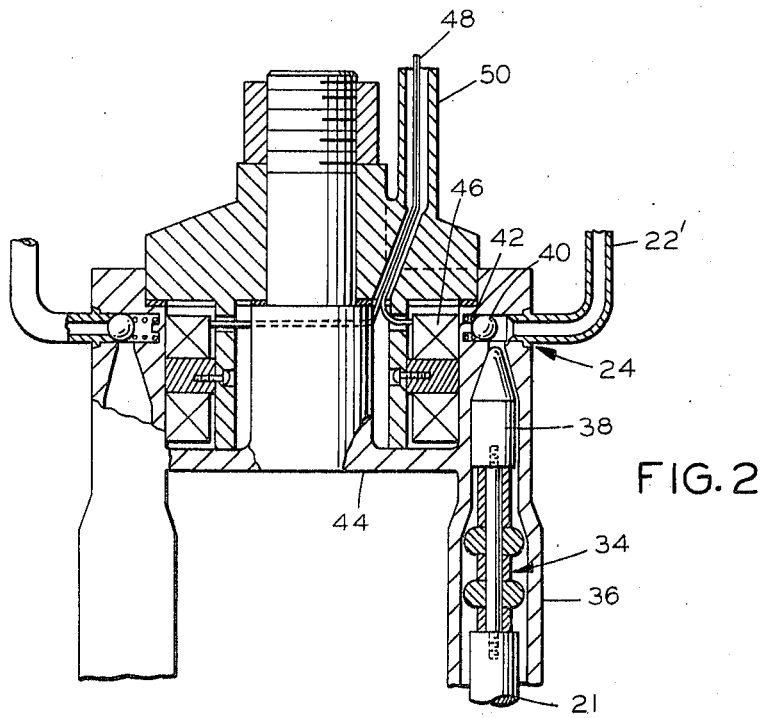
FIG. 2 is a cross-sectional side elevation view of a preferred embodiment of an isolation valve in accordance with the invention.

It is to be noted that FIG. 2 is a cross-sectional view of an isolation valve assembly including a housing 44 which supports four separate valves. The incorporation of four valves in a single housing may be dictated by reactor geometry wherein the control rods are often arranged in square patterns of four rods each. However, it is to be understood that the valves can, as depicted in FIG. 1, have separate housings or any appropriate number of valves can be incorporated within a single housing.

Valve 24 also includes a solenoid 46. Solenoid 46 is energized by current supplied from the exterior of the pressure vessel via conductors 48 positioned within conduit 50.

In operation, presuming that a particular absorber element of interest is initially fully inserted in the fuel assembly, valve 42 will normally be closed with the ball poppet 40 being urged against the valve seat by spring 42. The lift pump 26 will typically be continuously operating. However, with the valve 24 closed there will be no pressure differential developed across lift piston 34 and thus the absorber element will remain in the inserted position. Should there be a control line rupture at this time valve 24 will remain closed and the absorber element will remain inserted.

When it is desired to raise the absorber element current will be supplied to valve actuator solenoid 46 thereby generating a magnetic field which pulls ball poppet 40 away from the valve seat against the bias spring 42. Valve 24 will thereupon open and maximum lift flow will be immediately generated. The establishment of lift flow will, through the action of lift piston 34, cause the absorber element to move upwardly. When the absorber element reaches its fully raised or withdrawn position the buffer element 38 will come within the influence of the field generated by solenoid 46. As noted above, buffer element 38 is either comprised of or includes a slug of magnetic material. Accordingly, when the absorber element reaches the fully raised position the attraction between the magnetic portion of buffer element 38 and solenoid 46 will be sufficient to hold the absorber element in the raised position as shown for the right hand element of FIG. 2. The absorber element will remain in the raised position until solenoid 46 is deenergized at which time gravity reinsertion of the absorber element will occur.

It is to be noted that the magnetic "latching" of the absorber elements in the raised position can be mechanically assisted. Thus, by way of example, cooperating serrated surfaces may be provided on the buffer element and cylinder wall or a detent arrangement can be included.

It is also to be observed that valve 24 may be designed so that buffer element 38 will distort the field produced by magnet 46 whereby the valve will be automatically closed when the absorber element reaches its fully raised position. Alternatively, the power to solenoid 46 can be reduced when the absorber element is fully raised whereby the spring bias will overcome the magnetic forces and close the valve. A further possibility is the utilization of separate solenoids for valve control and latching functions.

Since the absorber element is magnetically held in the raised position, when all of the absorber elements or a group of associated absorber elements have been raised there is no need to maintain holding flow past the lift pistons. Accordingly, when the requisite number of absorber elements have been raised, the shut-off valve 30 may be closed thereby disconnecting lift pump 26 from the control lines and terminating flow past the lift pistons. This is a decided improvement over the prior art since the previous requirement for continuous holding flow with absorber elements in the raised position resulted in erosion of the valve seats of the control valves and added to the external pumping requirements for the control systems. As will be discussed briefly below, the operation of valve 30 can be achieved automatically. It is also to be noted that, if deemed desirable, an individual shut-off valve may be incorporated in each of lines 22 rather than employing a valve or valves associated with groups of control lines as shown.

When the slug of magnetic material comprising buffer 38 is positioned adjacent solenoid 46, the inductance of the solenoid and thus its reactance will change. This change in inductive reactance will result in a corresponding change in the current through the solenoid. The change in current may be sensed and employed as an indication of the fully raised position of the absorber element. Thus, in accordance with the present invention, the differential pressure sensitive indicators of the prior art are eliminated. The electrical position indication provided by monitoring the current through solenoids 46 may also be employed, in a manner which will be obvious to those skilled in the art, to automatically control the shut-off valve or valves 30 and/or to cause the closing of valve 24.

While a preferred embodiment has been shown and described, various modifications and substitutions may be made thereto without departing from the spirit and scope of the invention. Accordingly, it is to be understood that the present invention has been described by way of illustration and not limitation.

The embodiments of the invention in which an exclusive property or privilege is claimed are defined as follows:

1. In a fission rate control system for a nuclear reactor, the reactor including a vessel through which a pressurized coolant is circulated, the control system including neutron absorber element means movable within tubular guide members relative to a fuel assembly in response to the establishment of a pressure differential across the absorber element means, the improvement comprising:
- a source of lift pressure which differs from the coolant pressure maintained within the reactor vessel;
- means including normally closed magnetically actuated isolation valves associated with each guide member for selectively controlling the application of lift pressure from said source to first ends of the tubular guide members, said isolation valves being positioned within the reactor vessel adjacent the said first ends of the guide members;
- magnetic field responsive means carried by each of the absorber element means;
- means juxtapositioned to the said first ends of the tubular guide members for selectively generating magnetic fields, said magnetic fields encompassing said isolation valves and the said first ends of the guide members, said field generating means causing opening of said isolation valves when energized whereby a lift flow will be established and the absorber element means associated with the open valves will be moved from the vicinity of the second ends of the guide members to the first ends thereof, the field provided by said field generating means attracting said field responsive means to magnetically latch at the said first ends of the tubular guide members absorber elements associated with open valves; and
- means for applying the reactor vessel coolant to the guide members whereby a pressure differential will be established across the absorber element means with said isolation valves in the open condition.

2. The apparatus of claim 1 wherein said isolation valve including means each comprise:
- conduit means providing fluid communication between said lift pressure source and at least a first tubular guide member;
- means in said conduit means defining a valve seat;
- a valve element comprised of magnetic material, said valve element cooperating with said valve seat to interrupt fluid flow between the interior of the guide member and said source; and
- means resiliently biasing said valve member against said seat defining means.

3. The apparatus of claim 2 further comprising:
shut-off valve means located exteriorly of the pressure vessel upstream of said lift pressure source, said shut-off valve means being normally opened and being closed to terminate lift flow when said field responsive means is magnetically latched upon movement into the field generated by said field generating means.

4. The apparatus of claim 1 further comprising:
shut-off valve means located exteriorly of the pressure vessel upstream of said lift pressure source, said shut-off valve means being normally opened and being closed to terminate lift flow when said field responsive means is magnetically latched upon movement into the field generated by said field generating means.

5. A method of controlling the positioning of a neutron absorber element with relation to the fuel assembly of a pressurized water reactor, the reactor including a control system wherein normally closed solenoid operated valves are associated with each absorber element, the method comprising the steps of:
- generating a magnetic field for opening a normally closed control valve when it is desired to withdraw a selected absorber element from the fuel assembly;
- generating a lift pressure for application to the absorber element via the control valve upon the opening thereof whereby a lift flow for raising the selected absorber element will be established; and
- employing the thus generated valve controlling magnetic field to magnetically latch the selected absorber element in the raised position at its upward limit of travel.

6. The method of claim 5 wherein the solenoid operated control valves are resiliently biased in the closed position, the method further comprising the step of:
reducing the strength of the generated magnetic field when the absorber element reaches its limit of upward travel to permit the closing of the control valve.

7. The method of claim 5 further comprising the step of:
terminating the lift flow when the absorber element has been magnetically latched in the raised position.

* * * * *